US010309512B2

(12) United States Patent
Santinato et al.

(10) Patent No.: US 10,309,512 B2
(45) Date of Patent: Jun. 4, 2019

(54) AXLE ASSEMBLY

(71) Applicant: Meritor Heavy Vehicle Systems Cameri SpA, Cameri (Novara) (IT)

(72) Inventors: Fabio Santinato, Cameri (IT); Cesare Bonfa, Cameri (IT); Maurizio Lupi, Cameri (IT)

(73) Assignee: Meritor Heavy Vehicle Systems Cameri SpA, Cameri (Novara) (IT)

(*) Notice: Subject to any disclaimer, the term of this patent is extended or adjusted under 35 U.S.C. 154(b) by 6 days.

(21) Appl. No.: 15/467,657

(22) Filed: Mar. 23, 2017

(65) Prior Publication Data
US 2017/0284526 A1  Oct. 5, 2017

(30) Foreign Application Priority Data

Mar. 29, 2016  (EP) .................................... 16162665

(51) Int. Cl.
*B60B 35/14*  (2006.01)
*B60B 35/16*  (2006.01)
(Continued)

(52) U.S. Cl.
CPC ............. *F16H 48/40* (2013.01); *B60B 35/14* (2013.01); *B60B 35/16* (2013.01); *B60B 35/163* (2013.01);
(Continued)

(58) Field of Classification Search
CPC ...... F16H 48/40; F16H 57/037; F16H 57/031; F16H 48/08; F16H 2048/385; F16H 2048/382; B60B 35/14; B60B 35/16; B60B 35/163; B60B 2320/10; B60B 2310/20; B60B 2900/511; B60K 17/165
(Continued)

(56) References Cited

U.S. PATENT DOCUMENTS 1,966,434 A  7/1934  Barker
2,242,195 A  5/1941  Teker et al.
(Continued)

FOREIGN PATENT DOCUMENTS

CN  101240841 A  8/2008
CN  102395815 A  3/2012
(Continued)

OTHER PUBLICATIONS

European Patent Office, Extended European Search Report for the corresponding European Patent Application No. 16162665.0, dated Sep. 14, 2016.
(Continued)

*Primary Examiner* — Jacob S. Scott
*Assistant Examiner* — James J Taylor, II
(74) *Attorney, Agent, or Firm* — Brooks Kushman P.C.

(57) ABSTRACT

An axle assembly and method of reworking an axle assembly. The axle assembly has an axle housing and a differential carrier assembly. A central portion of the axle housing has an opening that is defined by an axle flange that has a first mating surface. The differential carrier assembly has a differential mounted on a carrier. The carrier has a carrier flange that has a second mating surface. The first mating surface is sealed to the second mating surface by seal. At least one of the first and second mating surfaces includes a groove.

20 Claims, 4 Drawing Sheets

(51) Int. Cl.
*B60K 17/16* (2006.01)
*F16H 48/08* (2006.01)
*F16H 48/38* (2012.01)
*F16H 48/40* (2012.01)
*F16H 57/037* (2012.01)
*F16H 57/031* (2012.01)

(52) U.S. Cl.
CPC ........... *F16H 48/08* (2013.01); *F16H 57/031* (2013.01); *F16H 57/037* (2013.01); *B60B 2310/20* (2013.01); *B60B 2320/10* (2013.01); *B60B 2900/511* (2013.01); *B60K 17/165* (2013.01); *F16H 2048/382* (2013.01)

(58) Field of Classification Search
USPC ....................................................... 475/220
See application file for complete search history.

(56) References Cited

U.S. PATENT DOCUMENTS

| | | | | |
|---|---|---|---|---|
| 3,049,928 | A | * | 8/1962 | Boughner ............... F16H 37/00 180/53.1 |
| 3,800,913 | A | | 4/1974 | Schmitt |
| 4,625,581 | A | | 12/1986 | Hull |
| 4,683,985 | A | | 8/1987 | Hultgren |
| 4,754,847 | A | * | 7/1988 | Glaze .................... B60K 17/16 184/6.12 |
| 5,161,644 | A | | 11/1992 | Swenskowski et al. |
| 5,163,226 | A | * | 11/1992 | Phelps .................. B21D 53/90 29/897.2 |
| 5,232,291 | A | | 8/1993 | Kuan |
| 5,234,072 | A | * | 8/1993 | Chludek ............ B60K 17/3465 180/248 |
| 5,540,300 | A | | 7/1996 | Downs et al. |
| 5,637,049 | A | * | 6/1997 | Zentmyer .............. B60K 17/20 192/49 |
| 5,644,954 | A | | 7/1997 | Matsufuji |
| 5,839,327 | A | * | 11/1998 | Gage .................. F16H 57/0412 74/607 |
| 5,941,136 | A | * | 8/1999 | Kusukawa ......... B60K 17/3465 180/53.6 |
| 6,132,329 | A | | 10/2000 | Tison |
| 7,121,972 | B2 | * | 10/2006 | Allmandinger ...... B60K 17/165 475/230 |
| 9,334,945 | B1 | * | 5/2016 | Smakal ................. F16H 57/027 |
| 2003/0177859 | A1 | * | 9/2003 | Allmandinger ......... B60B 35/16 74/607 |
| 2004/0144597 | A1 | | 7/2004 | Metelues et al. |
| 2008/0227581 | A1 | * | 9/2008 | Catalano ................. B60B 35/16 475/220 |
| 2009/0233752 | A1 | * | 9/2009 | Bowers .................... F16H 48/08 475/237 |
| 2010/0009803 | A1 | | 1/2010 | Giger |
| 2011/0075960 | A1 | * | 3/2011 | White ..................... F16C 19/30 384/606 |
| 2011/0162482 | A1 | | 7/2011 | Jacobs et al. |
| 2012/0073403 | A1 | | 3/2012 | Perakes et al. |
| 2012/0142476 | A1 | * | 6/2012 | Gianone ............. F16H 57/0447 475/160 |
| 2013/0274054 | A1 | | 10/2013 | Barillot |
| 2013/0296095 | A1 | | 11/2013 | Kwasniewski et al. |
| 2014/0069230 | A1 | | 3/2014 | Trost |
| 2014/0251080 | A1 | * | 9/2014 | McGuire ............... F16H 57/029 74/606 R |
| 2014/0342866 | A1 | * | 11/2014 | Valente ................... F16H 48/08 475/86 |
| 2015/0087461 | A1 | * | 3/2015 | Jackson ................. F16H 48/08 475/160 |
| 2015/0354691 | A1 | * | 12/2015 | Keeney ................ F16H 57/037 74/607 |

FOREIGN PATENT DOCUMENTS

| | | |
|---|---|---|
| CN | 105073473 A | 11/2015 |
| DE | 710894 C | 9/1941 |
| EP | 1375970 A2 | 1/2004 |
| EP | 1707423 A2 | 10/2006 |
| EP | 2708777 A1 | 3/2014 |
| JP | 5937462 U | 3/1984 |
| JP | 2008224035 A | 9/2008 |
| JP | 2012210839 A | 11/2012 |

OTHER PUBLICATIONS

The State Intellectual Property Office of People's Republic of China, First Office Action for corresponding Chinese Application No. 201710190078.8, dated Dec. 28, 2018 (including English translation).

The State Intellectual Property Office of People's Republic of China, First Search for corresponding Chinese Application No. 201710190078.8, dated Dec. 12, 2018.

* cited by examiner

AXLE ASSEMBLY

TECHNICAL FIELD

The present invention relates to an axle assembly, in particular an axle assembly for a heavy vehicle such as a lorry or truck.

BACKGROUND

Road vehicles are known which include driven rear axles. The rear axles include a crown wheel and pinion and differential. The pinion is driven via a drive shaft or the like connected to a prime mover such as an engine. The pinion and drive shaft rotate about a longitudinal axis of the vehicle. The pinion together with the crown wheel enables the crown wheel to rotate about an axis which is laterally orientated relative to the vehicle. The crown wheel drives a differential mechanism which drives a right and left hand drive shaft (known as half shafts). The right hand drive shaft drives a right hand wheel rotatably mounted to the axle and the left hand drive shaft drives a left hand wheel rotatably mounted to the axle. In this way the vehicle can be driven over the ground.

The crown wheel, pinion and differential assembly require lubrication and cooling and a fluid, typically an oil, will perform this dual function. The crown wheel, pinion and differential assembly are mounted on a differential carrier assembly that is fixed to the axle housing by bolts. When the vehicle is driven, the axle housing and the differential carrier assembly experience vertical, longitudinal and torsional forces, which cause deformation of the axle housing and the differential carrier assembly. This causes leakage of the fluid from the resulting gaps between the differential carrier assembly and the axle housing.

It is known to include gaskets or sealants between the differential carrier assembly and the axle housing in order to prevent leakage, however leakage of fluid still occurs. This is a particular problem for lightweight axle housings, for which the reduced weight results in greater deformation.

The leakage of fluid from the axle housing results in high warranty costs and so an axle assembly with improved resistance to vertical, longitudinal and torsional forces is required.

SUMMARY

Thus according to the present invention there is provided an axle assembly including an axle housing having a central portion for receiving a differential, a first axle tube extending from the central portion, and a second axle tube extending from the central portion, the central portion having an opening defined by an axle flange, the axle flange having a first mating surface. The axle assembly further includes a differential carrier assembly having a differential mounted on a carrier, the carrier having a carrier flange which has a second mating surface. The first mating surface is sealed to the second sealing surface by seal. At least one of the first and/or second mating surfaces includes a groove.

The groove may be formed in at least one of the first and/or second mating surfaces such that the at least one of the first and/or second mating surfaces forms a wall surrounding the groove. The groove may be formed in at least one of the first and/or second mating surfaces such that the groove is spaced apart from an outer edge of the at least one first and/or second mating surfaces. The groove may be formed in at least one of the first and/or second mating surfaces such that the groove is spaced apart from an inner edge of the at least one first and/or second mating surfaces. The groove may not extend to an outer edge of the at least one first and/or second mating surfaces. The groove may not extend to an inner edge of the at least one first and/or second mating surfaces. The groove may form a trough in the at least one of the first and/or second mating surfaces. The groove may be a hollow in the at least one of the first and/or second mating surfaces. The groove may be a depression in the at least one of the first and/or second mating surfaces. The groove may have a continuous outer edge or wall that is formed in a flat surface of the at least one of the first and/or second mating surfaces.

The groove may accommodate, house or contain a volume of the seal.

Advantageously including a groove in at least one of the mating surfaces reduces the leakage of fluid from the axle assembly. The groove enables the inclusion of a thicker seal, which fills a larger gap than standard seal. Because the gap to be filled is larger, then the local thickness of the seal is thicker and this locally thicker seal can better withstand deflections, and thereby better prevent leakage of fluid.

The central portion may be formed by casting. The opening may be generally circular. The first mating surface may be generally flat.

The differential carrier assembly may include a crown wheel in driving engagement with a pinion. The carrier may be cast. The carrier flange may be generally circular. The second mating surface may be generally flat.

The seal may include a mechanical seal, for example a gasket or a sealant such as a gasket maker or a flange sealant. The mechanical seal may include a ductile material. Ductility is the ability of a material to be permanently deformed without breaking when a force is applied. The extent to which a specimen stretches before fracture is its percentage elongation. The elongation of the mechanical seal may be more than 200% of the thickness of the seal, preferably more than 500% of the thickness of the seal. The ductile material may include a polymer, for example silicone. The seal may be an elastomeric sealant.

The groove may be elongate. The groove may be circumferentially oriented with respect to the first and/or the second mating surface. The groove may extend around less than 45 degrees of the first and/or second mating surface, preferably less than 30 degrees, more preferably less than 20 degrees. The groove may have a length of less than 200 millimeters, preferably less than 100 millimeters. The groove may have a depth of less than 2 millimeters. The groove may preferably have a depth that is less than or equal to 1 millimeter. The groove may be machined in the first and/or second mating surface. Alternatively, the groove may be cast in the first and/or second mating surface.

The axle flange may have a plurality of fastener holes. The plurality of fastener holes may be spaced circumferentially around the axle flange. The plurality of fastener holes may be threaded to receive a threaded stud or a threaded bolt.

The groove may have a first end that is adjacent to a first fastener hole and a second end that is adjacent to a second fastener hole, wherein the first fastener hole and second fastener hole are positioned sequentially around the circumference of the axle flange.

The axle flange and/or the carrier flange may include a first notch and a second notch to accommodate the crown wheel. The groove may be located on the first mating surface adjacent to one of the first or the second notches. The axle assembly may include a second groove located on the same mating surface as the first groove. The second groove may be located adjacent to the other of the first or second notches.

BRIEF DESCRIPTION OF THE DRAWINGS

The invention will now be described, by way of example only, with reference to the accompanying drawings in which.

DETAILED DESCRIPTION

Figure 1:
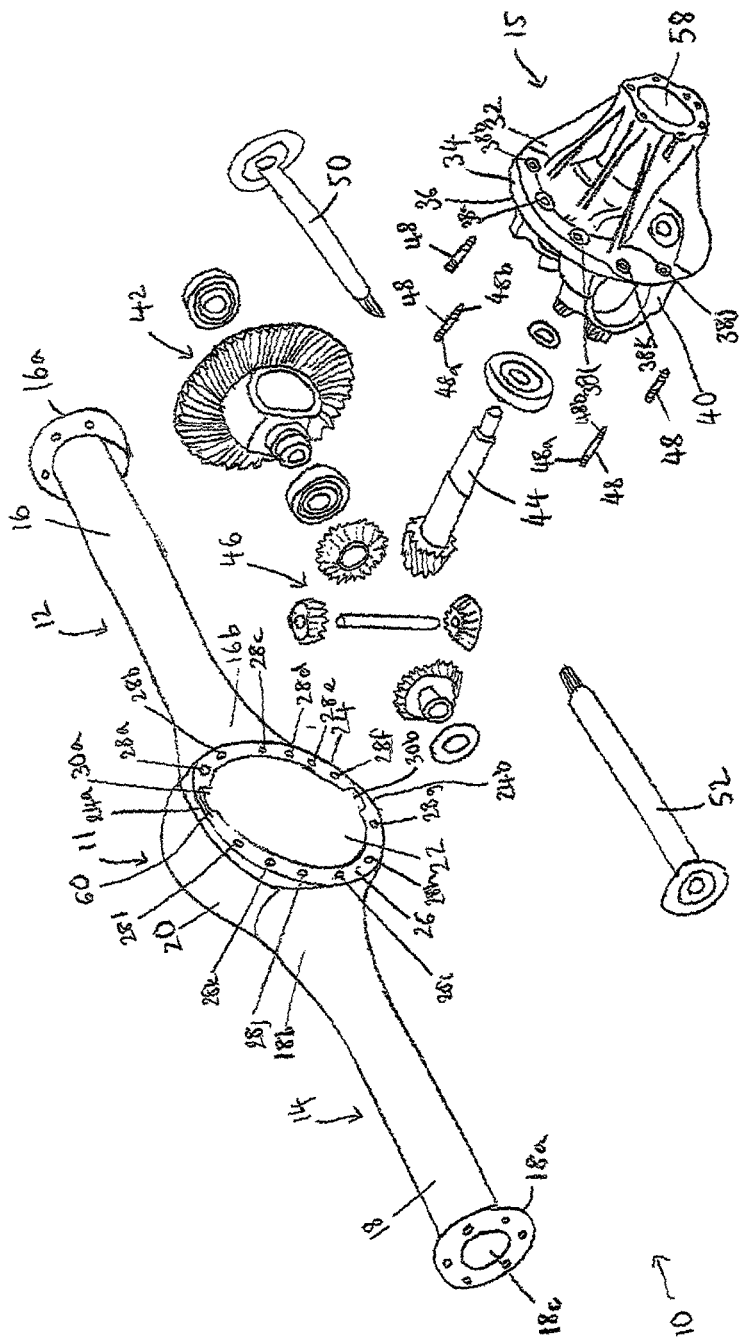
FIG. 1 is a partial exploded view of an axle assembly according to the present invention.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

With reference to FIGS. 1 to 4, there is shown an axle assembly 10 according to the present invention. The axle assembly 10 includes an axle housing 11 and a differential carrier assembly 15.

The axle housing 11 is defined by a first part 12, a second part 14 and a center portion 20 (also known as a central bowl).

The first part 12 includes a first axle tube 16 (in this case a left hand axle tube or left hand housing leg) having a first end 16a (or outboard end) and a second end 16b (or inboard end). The first axle tube 16 has a first opening (not shown) at the first end 16a and a second opening (not shown) at the second end 16b.

The second part 14 includes a second axle tube 18 (in this case a right hand axle tube or right hand housing leg) having a first end 18a (or outboard end) and a second end 18b (or inboard end). The second axle tube 18 has a first opening 18c at the first end 18a and a second opening (not shown) at the second end 18b.

The center portion 20 is a hollow structure, cast from a metal such as cast iron. The center portion 20 includes an opening 22, which is generally circular. The opening 22 is defined by an axle flange 24. The axle flange 24 is generally annular and has a generally flat mating surface 26. The first mating surface 26 includes twelve fastener holes 28a, 28b, 28c, 28d, 28e, 28f, 28g, 28h, 28i, 28j, 28k, 28l, which are spaced circumferentially around the first mating surface 26. Each of the fastener holes 28a, 28b, 28c, 28d, 28e, 28f, 28g, 28h, 28i, 28j, 28k, 28l is threaded.

The axle flange 24 also includes a pair of notches 30a, 30b and a groove 60.

The pair of notches 30a, 30b extend from the axle flange 24 into the opening 22 of the center portion 20. Notch 30a is located on an upper portion 24a of the axle flange 24 and notch 30b is located on a lower portion 24b of the axle flange 24.

The groove 60 is elongate and has a first end 62 and a second end 64. The groove 60 is positioned adjacent to the notch 30a on the upper portion 24a of the axle flange 24. The first end 62 of the groove 60 is positioned adjacent to fastener hole 28a in the first mating surface 26 and the second end 64 of the groove 60 is positioned adjacent to fastener hole 28l in the first mating surface 26. Fastener hole 28a is positioned adjacent to fastener hole 28l around the periphery of the first mating surface 26. The groove 60 is less than 200 millimeters long and extends around less than 30 degrees of the first mating surface 26. The groove has a depth of approximately 1 millimeter. The groove 60 is surrounded by a continuous edge or wall in the generally flat mating surface 26 of the axle flange 24, thus forming a trench in the generally flat mating surface 26.

The first axle tube 16 is connected to the center portion 20 such that the second opening at the second end 16b of the first axle tube 16 opens into the center portion 20. Similarly, the second axle tube 18 is connected to the center portion 20 such that the second opening at the second end 18b of the second axle tube 18 opens into the center portion 20. In this way, the first and second axle tubes 16, 18 are connected by the center portion 20.

Figure 2:
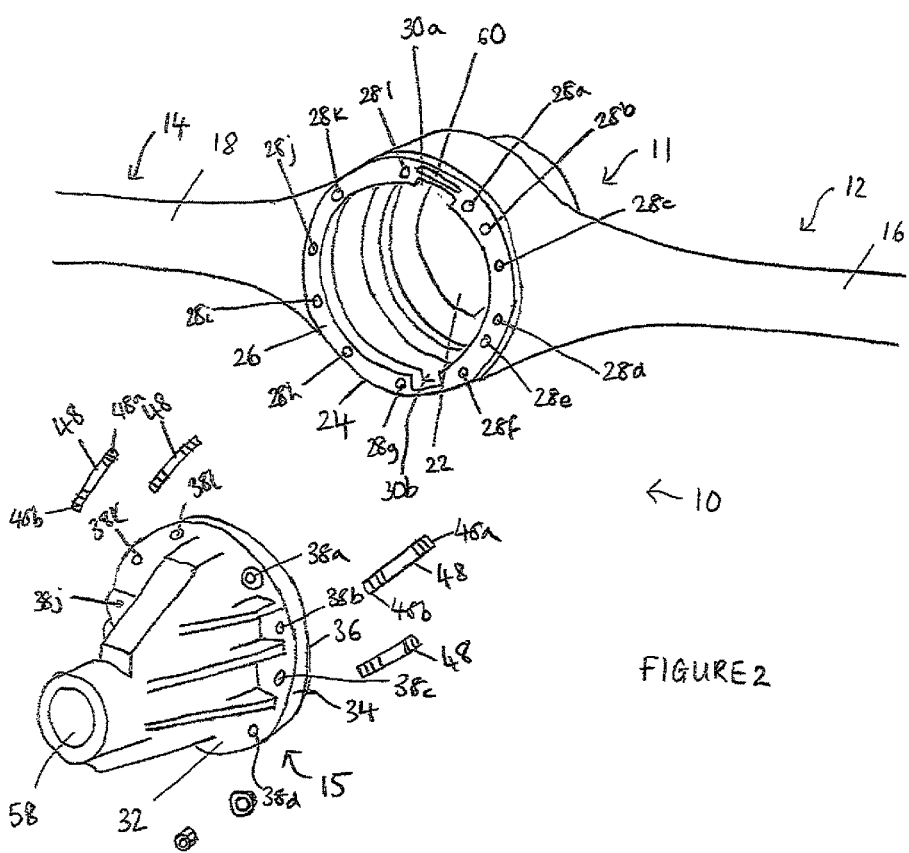
FIG. 2 is a partial exploded view of the axle assembly of FIG. 1.
Figure 3:
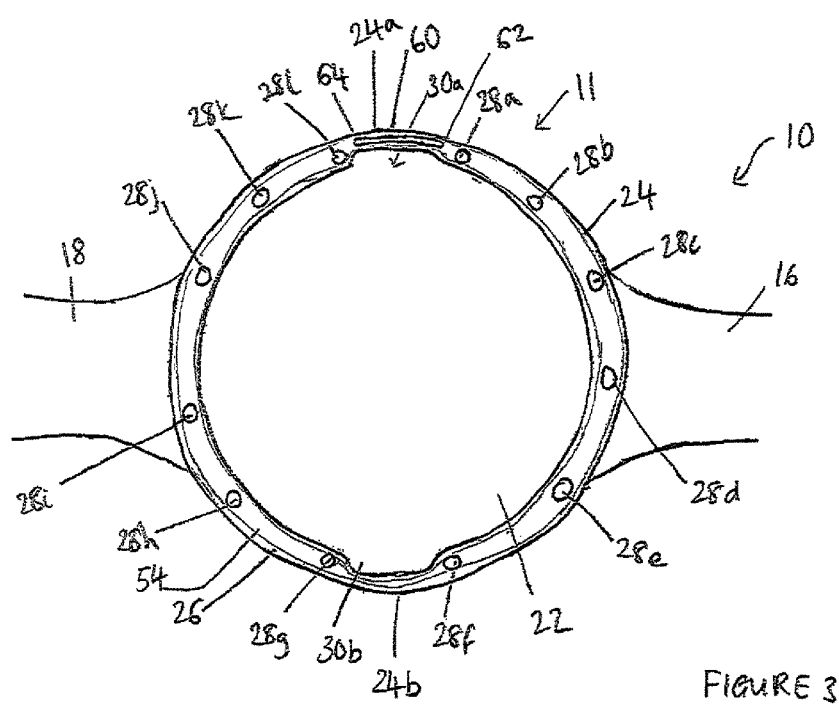
FIG. 3 is a plan view of the axle housing of the axle assembly of FIGS. 1 and 2.
Figure 4:
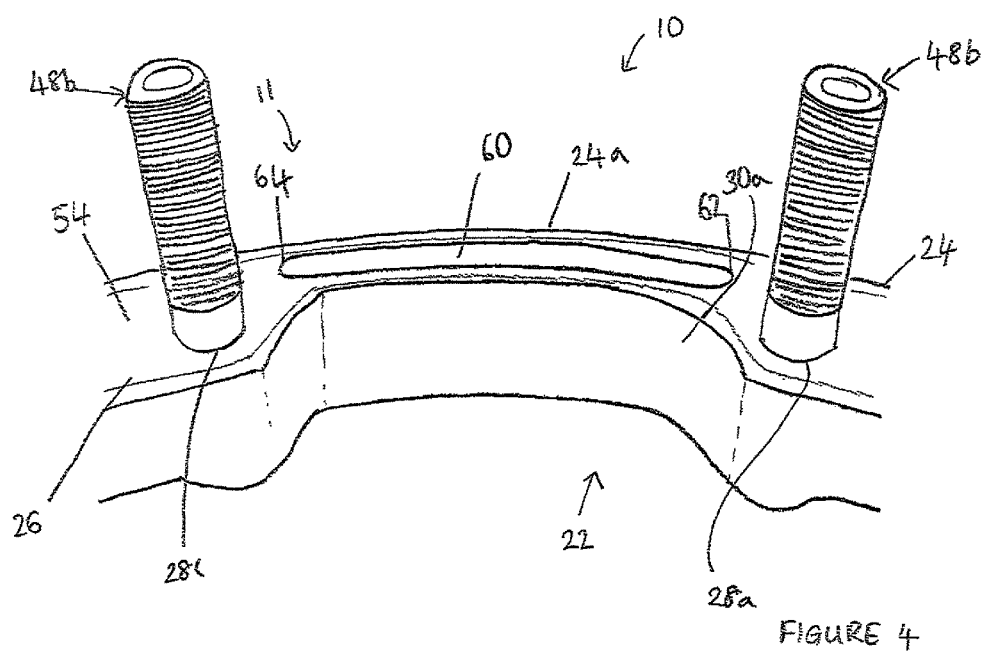
FIG. 4 is a partial perspective view of the axle housing of FIG. 3.

The differential carrier assembly 15 has a carrier 32. The carrier 32 includes a carrier flange 34 and a mount 40. The carrier flange 34 is generally annular and has a second mating surface 36 that is generally flat. The second mating surface 36 includes twelve fastener holes 38a, 38b, 38c, 38d, 38e, 38f, 38g, 38h, 38i, 38j, 38k, 38l (only some of which are shown in FIGS. 1 and 2), which are spaced circumferentially around the second mating surface 36. Each of the fastener holes 38a, 38b, 38c, 38d, 38e, 38f, 38g, 38h, 38i, 38j, 38k, 38l is threaded.

The mount 40 supports a crown wheel 42, and a differential 46.

The differential carrier assembly 15 includes bearings to rotatably support the pinion 44. Further bearings rotatably support the crown wheel 42. These bearings are mounted on mount 40 connected to the differential carrier assembly 15. The crown wheel 42 is in meshing engagement with the pinion 44 in a manner known in the art.

The center portion 20 is sized and shaped to accommodate the crown wheel 42, pinion 44, differential 46 and the mount 40. The opening 22 is sized and shaped to allow the crown wheel 42, pinion 44, differential 46 and the mount 40 to be passed through the opening 22 and to be received in the center portion 20. The notches 30a, 30b in the axle flange 24 are sized and positioned to provide additional space for the outer diameter of the crown wheel 42, thereby facilitating rotation of the crown wheel 42 when the axle housing 11 and differential carrier assembly 15 are assembled. The differential carrier assembly 15 acts as a cover to close the opening 22 of the center portion 20. In this way, a fluid for example oil (not shown) for lubricating and cooling the crown wheel 42, pinion 44 and differential 46 can be retained within the axle housing 11 and the differential carrier assembly 15.

The axle assembly 10 is assembled as follows.

The pinion 44 is mounted on the carrier 32. The crown wheel 42, and differential 46 are mounted on the mount 40 of the carrier 32.

The differential carrier assembly 15, upon which the crown wheel 42, pinion 44 and differential 46 are mounted, is brought into contact with the axle housing 11 such that the crown wheel 42, pinion 44 and differential 46 and the mount 40 are accommodated within the center portion 20.

A layer of sealant 54, for example an elastomeric sealant e.g., a silicone sealant, such as Dow Corning 7091, Loctite 509, Loctite 518, Permabond LH195 or Permabond LH197, is applied to the first mating surface 26. The sealant 54 is applied to fill the groove 60 in the first mating surface 26.

The second mating surface 36 of the differential housing assembly 14 is brought into contact with the layer of sealant 54 on the first mating surface 26, such that each of the fastener holes 38a, 38b, 38c, 38d, 38e, 38f, 38g, 38h, 38i, 38j, 38k, 38l in the second mating surface 36 is lined up with each of the fastener holes 28a, 28b, 28c, 28d, 28e, 28f, 28g, 28h, 28i, 28j, 28k, 28l in the first mating surface 26. The sealant 54 provides a sealing connection between the first mating surface 26 and the second mating surface 36.

Threaded bolts or studs 48 (only 4 of which are shown in FIGS. 1 and 2) are passed through the fastener holes 38a, 38b, 38c, 38d, 38e, 38f, 38g, 38h, 38i, 38j, 38k, 38l of the second mating surface 36 and the fastener holes 28a, 28b, 28c, 28d, 28e, 28f, 28g, 28h, 28i, 28j, 28k, 28l of the first mating surface 26 in order to secure the carrier assembly 15 to the axle housing 11. The threaded bolts 48 have a threaded portion 48a at one of their ends and a second threaded portion 48b at the other of their ends. The threaded portion 48a of each of the threaded bolts 48 engages the threaded portion (not shown) of each of the fastener holes 28a, 28b, 28c, 28d, 28e, 28f, 28g, 28h, 28i, 28j, 28k, 28l in the first mating surface 26. The threaded portion 48b of each of the threaded bolts 48 engages the threaded portion (not shown) of each of the fastener holes 38a, 38b, 38c, 38d, 38e, 38f, 38g, 38h, 38i, 38j, 38k, 38l in the second mating surface 36.

The axle assembly 10 is connected to the engine by a drive shaft (not shown) that extends through opening 58 in the differential carrier assembly 15 to the pinion 44. The engine (not shown) causes the drive shaft (not shown) and pinion 44 to rotate about a longitudinal axis of the vehicle (not shown).

The pinion 44 is drivingly engaged to the crown wheel 42 to enable the crown wheel to rotate about an axis which is laterally orientated relative to the vehicle (not shown).

The left hand drive shaft 50 extends through the opening (not shown) in the left hand axle tube 16 and the right hand drive shaft 52 extends through opening 18c in the right hand axle tube 18.

In this way, the left and right hand drive shafts 50, 52 are caused to rotate in a direction which is laterally orientated relative to the vehicle. The left hand drive shaft 50 drives a left hand wheel (not shown) that is rotatably mounted to the axle and the right hand drive shaft 52 drives a right hand wheel rotatably mounted to the axle.

The differential 46 interacts with the crown wheel 42 to enable the left and right hand drive shafts 50, 52 to rotate at different speeds, for example when the vehicle is driving around a corner.

During movement of the vehicle, the axle housing 11 and differential carrier assembly 15 are exposed to vertical, longitudinal and torsional forces caused by movement of the vehicle, the wheels and the axle shafts.

These forces cause deformation of the axle assembly 10. The formation of gaps between the axle housing 11 and the differential carrier assembly 15 is prevented by the sealant 54 within the groove 60 and in the between the first mating surface 26 and the second mating surface 36.

The elongation of the sealant material is 600% of the thickness of the sealant applied to the first mating surface 26. In use, the additional sealant 54 within the groove 60 is able to deform to fill any gaps that might otherwise form between the axle housing 11 and the differential carrier assembly 15 as a result of vertical, longitudinal and torsional forces acting on the axle assembly 10 caused by movement of the vehicle. In this way, leakage of fluid from within the axle assembly is prevented.

The groove 60 is positioned between adjacent fastener holes so that the sealant 54 is provided at a region of the axle assembly 10 that is not secured or fastened together by threaded bolts or studs 48, i.e., the sealant 54 is provided at a region that is at risk of gaps forming when the axle assembly 10 is exposed to vertical, longitudinal and/or torsional forces.

The groove 60 is positioned adjacent to the notches 30a, 30b since this is a region of the axle flange 24 where the width of the first mating surface 26 is reduced. This region of the axle flange 24 is at risk of gaps forming when the axle assembly 10 is exposed to vertical, longitudinal and/or torsional forces.

In the embodiment described above, the center portion 20 of the axle housing 11 is cast with the groove 60 on the first mating surface 26. In alternative embodiments, the groove may be formed by machining.

In the embodiment described above, the groove 60 is positioned adjacent to the notch 30a on the upper portion 24a of the axle flange 24, with the first end 62 of the groove 60 positioned adjacent to fastener hole 28a and the second end 64 of the groove 60 positioned adjacent to fastener hole 28l. The fastener hole 28a is adjacent to the fastener hole 28l. The fastener holes 28a, 28l are positioned next to each other, or contiguous, or physically adjacent, or neighboring, around the periphery or circumference of the axle flange 24. In alternative embodiments, the groove may be positioned adjacent to the notch 30b on the lower portion 24b of the axle flange 24, with the first end 62 of the groove positioned adjacent to fastener hole 28f and the second end 64 of the groove positioned adjacent to fastener hole 28g. The fastener hole 28f is adjacent to the fastener hole 28g. The fastener holes 28f, 28g are positioned next to each other, or contiguous, or physically adjacent, or neighboring, around the periphery or circumference of the axle flange 24. In alternative embodiments, the groove may be positioned such that the first end 62 is adjacent to one of the fastener holes 28a, 28b, 28c, 28d, 28e, 28f, 28g, 28h, 28i, 28j, 28k, 28l and the second end 64 is adjacent to a second of the fastener holes, the second of the fastener holes being positioned adjacent to, contiguous with or next to, or physically adjacent, or neighboring, the first of the fastener holes.

In the embodiment described above, the groove 60 is located on the first mating surface 26 of the axle flange 24. In alternative embodiments, the groove may be located on the second mating surface 36 of the differential carrier assembly 15. The groove may be machined in the second mating surface 36 of the differential carrier assembly 15. In this way, a differential carrier assembly 15 having a groove may be retrofitted to an existing axle assembly.

In the embodiment described above, the sealant is a silicone sealant. In alternative embodiments, the sealant may include any material suitable for adhering and/or sealing the first mating surface 26 to the second mating surface 36, for example any gasket maker. In alternative embodiments, the sealant may be a gasket, for example a gasket including silicone.

In the embodiment described above, and as shown in FIGS. 1 and 2, the threaded bolts or studs 48 have threaded portions 48a, 48b at each of their ends. In alternative embodiments, bolts with threads at only one of the ends may be used.

In the embodiment described above, the axle flange 24 and the carrier flange 34 each have twelve fastener holes. In alternative embodiments, any number of fastener holes may be included on each of the axle flange 24 and the carrier flange 34.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An axle assembly comprising:
   an axle housing having a central portion for receiving a differential, the central portion having an opening defined by an axle flange that has a first mating surface, a first axle tube extending from the central portion, and a second axle tube extending from the central portion, wherein the axle flange has a plurality of fastener holes that are spaced circumferentially around the axle flange and are threaded to receive a threaded stud or a threaded bolt; and
   a differential carrier assembly having a carrier to which the differential is mounted, the carrier having a carrier flange that has a second mating surface;
   wherein the first mating surface is sealed to the second mating surface by a seal and the first mating surface, the second mating surface, or the first mating surface and the second mating surface include a groove, wherein the groove has a first end that is adjacent to a first fastener hole and a second end that is adjacent to a second fastener hole, wherein the first fastener hole and second fastener hole are contiguous around a circumference of the axle flange.

2. The axle assembly of claim 1 wherein the groove is elongate, circumferentially oriented, and extends around less than 30 degrees of the first mating surface, the second mating surface, or the first mating surface and the second mating surface.

3. An axle assembly comprising:
   an axle housing having a central portion for receiving a differential, the central portion having an opening defined by an axle flange that has a first mating surface, a first axle tube extending from the central portion, and a second axle tube extending from the central portion; and
   a differential carrier assembly having a carrier to which the differential is mounted, the carrier having a carrier flange that has a second mating surface;
   wherein the first mating surface is sealed to the second mating surface by a seal and the first mating surface, the second mating surface, or the first mating surface and the second mating surface include a groove, wherein the groove is elongate, circumferentially oriented, and extends around less than 30 degrees of the first mating surface, the second mating surface, or the first mating surface and the second mating surface.

4. The axle assembly of claim 3 wherein the differential carrier assembly includes a crown wheel in driving engagement with a pinion.

5. The axle assembly of claim 4 wherein the axle flange includes a first notch and a second notch to accommodate the crown wheel.

6. The axle assembly of claim 5 wherein the groove is located on the first mating surface adjacent to the first notch or the second notch.

7. The axle assembly of claim 6 wherein the first mating surface includes a second groove located adjacent to the first notch or the second notch.

8. The axle assembly of claim 3 wherein the seal is a gasket or a sealant.

9. The axle assembly of claim 3 wherein the seal is a mechanical seal.

10. The axle assembly of claim 9 wherein the mechanical seal includes a ductile material.

11. The axle assembly of claim 10 wherein the ductile material includes a polymer.

12. The axle assembly of claim 3 wherein the groove extends around less than 20 degrees of the first mating surface, the second mating surface, or the first mating surface and the second mating surface.

13. The axle assembly of claim 3 wherein the groove has a length that is less than 200 millimeters.

14. The axle assembly of claim 3 wherein the groove has a length that is less than 100 millimeters.

15. The axle assembly of claim 3 wherein the groove has a depth of less than 2 millimeters.

16. The axle assembly of claim 3 wherein the groove has a depth that is less than or equal to 1 millimeter.

17. The axle assembly of claim 3 wherein the axle flange has a plurality of fastener holes that are spaced circumferentially around the axle flange and are threaded to receive a threaded stud or a threaded bolt.

18. A method of reworking an axle assembly comprising:
   a) providing the axle assembly that includes:
      an axle housing that has a central portion for receiving a differential, a first axle tube extending from the central portion, and a second axle tube extending from the central portion, wherein the central portion has an opening defined by an axle flange that has a first mating surface, a differential carrier assembly having the differential mounted on a carrier, the carrier having a carrier flange having a second mating surface, wherein the differential carrier assembly is mounted on the axle housing with the first mating surface engaged with the second mating surface;
   b) removing the differential carrier assembly from the axle housing;
   c) forming a groove on the first mating surface, the second mating surface, or the first mating surface and the second mating surface, wherein the groove is elongate, circumferentially oriented, and extends around less than 30 degrees of the first mating surface, the second mating surface, or the first mating surface and the second mating surface;
   d) applying a seal to the first mating surface, the second mating surface, or the first mating surface and the second mating surface; and
   e) re-mounting the differential carrier assembly on the axle housing.

19. The method of claim 18 wherein the groove is formed on the second mating surface.

20. The method of claim 18 wherein the groove is formed on a second mating surface of a second differential carrier assembly and, in step e) the second differential carrier assembly is mounted on the axle housing.

* * * * *